United States Patent
Matsui et al.

(10) Patent No.: US 9,631,924 B2
(45) Date of Patent: Apr. 25, 2017

(54) SURFACE PROFILE MEASUREMENT METHOD AND DEVICE USED THEREIN

(71) Applicant: Hitachi High-Technologies Corporation, Minato-ku, Tokyo (JP)

(72) Inventors: Shigeru Matsui, Tokyo (JP); Yugo Onoda, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 34 days.

(21) Appl. No.: 14/890,844

(22) PCT Filed: Mar. 10, 2014

(86) PCT No.: PCT/JP2014/056092
§ 371 (c)(1),
(2) Date: Nov. 12, 2015

(87) PCT Pub. No.: WO2014/185133
PCT Pub. Date: Nov. 20, 2014

(65) Prior Publication Data
US 2016/0091304 A1    Mar. 31, 2016

(30) Foreign Application Priority Data

May 14, 2013  (JP) .................................. 2013-101792

(51) Int. Cl.
*G01B 11/24*    (2006.01)
*G01B 9/02*    (2006.01)
(Continued)

(52) U.S. Cl.
CPC ........ *G01B 11/2441* (2013.01); *G01B 9/0209* (2013.01); *G01B 9/02068* (2013.01);
(Continued)

(58) Field of Classification Search
CPC ............ G01B 11/2441; G01B 9/02049; G01B 9/02087; G01B 2290/35
(Continued)

(56) References Cited

U.S. PATENT DOCUMENTS 5,151,749 A    9/1992  Tanimoto et al.
5,398,113 A    3/1995  De Groot
(Continued)

FOREIGN PATENT DOCUMENTS

JP      5-240628 A    9/1993
JP      3295846 B2    6/2002
(Continued)

OTHER PUBLICATIONS

International Search Report (PCT/ISA/210) issued in counterpart International Application No. PCT/JP2014/056092 dated Apr. 22, 2014, with English translation (Three (3) pages).
(Continued)

*Primary Examiner* — Jonathan Hansen
(74) *Attorney, Agent, or Firm* — Crowell & Moring LLP

(57) ABSTRACT

To provide a technique that can measure a surface profile of any test object in a nondestructive manner and noncontact manner, highly accurately, and in a wide tilt angle dynamic range. In white light interference method using a dual beam interferometer, the technique is configured to be capable of changing a surface orientation of a standard plane with respect to an incident optical axis on the standard plane, acquires, while relatively changing the surface orientation of the standard plane with respect to a local surface orientation in any position on a test surface, a plurality of interferograms generated by interference of reflected light from the test surface and reflected light from the standard plane, and
(Continued)

calculates the local surface orientation on the test surface from the interferograms to thereby measure a surface profile of the test surface.

18 Claims, 5 Drawing Sheets

(51) Int. Cl.
*G01B 11/06* (2006.01)
*G01B 11/26* (2006.01)
*G01B 9/04* (2006.01)

(52) U.S. Cl.
CPC .......... *G01B 9/02087* (2013.01); *G01B 9/04* (2013.01); *G01B 11/0608* (2013.01); *G01B 11/26* (2013.01)

(58) Field of Classification Search
USPC .................................................. 356/511–514
See application file for complete search history.

(56) References Cited

U.S. PATENT DOCUMENTS

2006/0221348 A1 10/2006 Deck

2008/0137933 A1* 6/2008 Kim ...................... G01B 9/021
  382/131
2008/0174785 A1* 7/2008 Seitz .................. G01B 11/2441
  356/516
2012/0120485 A1* 5/2012 Ootomo .................... G01B 9/04
  359/370

FOREIGN PATENT DOCUMENTS

| JP | 2002-202112 A | 7/2002 |
| JP | 2006-242853 A | 9/2006 |
| JP | 2006-258557 A | 9/2006 |

OTHER PUBLICATIONS

Sato, A., "Advanced Metrology of Surface Texture by Scanning White Light Interferometry", The Journal of the Surface Finishing Society of Japan, vol. 57, No. 8, 2006, pp. 554-558, with partial English translation (Nine (9) pages).

Kondo, Y., "A Survey on Surface Metrology for Flatness Standard", AIST Bulletin of Metrology, vol. 8, No. 3, Sep. 2011, pp. 299-310 with partial English translation (Sixteen (16) pages).

Extended European Search Report issued in counterpart European Application No. 14798582.4 dated Dec. 8, 2016 (11 pages).

* cited by examiner

FIG. 3

STEP 1  GIVE COMMAND TO X-Y DRIVING/CONTROL UNIT 12 AND CAUSE X-Y DRIVING/CONTROL UNIT 12 TO MOVE X COORDINATE TO INITIAL VALUE POSITION
↓
STEP 2  REPEAT STEP 3 TO STEP 18 UNTIL X COORDINATE EXCEEDS END VALUE
↓
STEP 3  GIVE COMMAND TO X-Y DRIVING/CONTROL UNIT 12 AND CAUSE X-Y DRIVING/CONTROL UNIT 12 TO MOVE Y COORDINATE TO INITIAL VALUE POSITION
↓
STEP 4  REPEAT STEP 5 TO STEP 17 UNTIL Y COORDINATE EXCEEDS END VALUE
↓
STEP 5  GIVE COMMAND TO TILT-ANGLE CONTROL UNIT 18 AND CAUSE TILT-ANGLE CONTROL UNIT 18 TO MOVE $\theta x$ TO INITIAL ANGLE POSITION
↓
STEP 6  REPEAT STEP 7 TO STEP 15 UNTIL $\theta x$ EXCEEDS END VALUE
↓
STEP 7  GIVE COMMAND TO TILT-ANGLE CONTROL UNIT 18 AND CAUSE TILT-ANGLE CONTROL UNIT 18 TO MOVE $\theta y$ TO INITIAL ANGLE POSITION
↓
STEP 8  REPEAT STEP 9 TO STEP 14 UNTIL $\theta y$ EXCEEDS END VALUE
↓
STEP 9  GIVE COMMAND TO Z-AXIS CONTROL UNIT 14 AND CAUSE Z-AXIS CONTROL UNIT 14 TO MOVE Z COORDINATE TO INITIAL POSITION
↓
STEP 10 REPEAT STEP 11 TO STEP 12 UNTIL Z COORDINATE EXCEEDS END VALUE
↓
STEP 11 CAPTURE INTERFERENCE LIGHT INTENSITY SIGNAL 34
↓
STEP 12 GIVE COMMAND TO Z-AXIS CONTROL UNIT 14 AND CAUSE Z-AXIS CONTROL UNIT 14 TO MOVE Z COORDINATE BY PREDETERMINED PITCH
↓
STEP 13 CALCULATE MAXIMUM VALUE AND MINIMUM VALUE OUT OF PLURALITY OF INTERFERENCE LIGHT INTENSITY SIGNALS 34 OBTAINED BY MOVING Z COORDINATE IN STEP 9 TO STEP 12, CALCULATE INTERFERENCE CONTRAST 36 IN PRESENT $(\theta x, \theta y)$, AND STORE INTERFERENCE CONTRAST 36 TOGETHER WITH SET OF PRESENT $(\theta x, \theta y)$
↓
STEP 14 GIVE COMMAND TO TILT-ANGLE CONTROL UNIT 18 AND CAUSE TILT-ANGLE CONTROL UNIT 18 TO MOVE $\theta y$ BY PREDETERMINED PITCH
↓
STEP 15 GIVE COMMAND TO TILT-ANGLE CONTROL UNIT 18 AND CAUSE TILT-ANGLE CONTROL UNIT 18 TO MOVE $\theta x$ BY PREDETERMINED PITCH
↓
STEP 16 CALCULATE MAXIMUM VALUE OF PLURALITY OF INTERFERENCE CONTRASTS 36 OBTAINED BY MOVING $\theta x$ AND $\theta y$ IN STEP 5 TO STEP 15 AND A SET OF $(\theta x, \theta y)$ AT TIME OF MAXIMUM VALUE AND STORE SET OF $(\theta x, \theta y)$ TOGETHER WITH SET OF PRESENT (X COORDINATE, Y COORDINATE)
↓
STEP 17 GIVE COMMAND TO X-Y DRIVING/CONTROL UNIT 12 AND CAUSE X-Y DRIVING/CONTROL UNIT 12 TO MOVE Y COORDINATE BY PREDETERMINED PITCH
↓
STEP 18 GIVE COMMAND TO X-Y DRIVING/CONTROL UNIT 12 AND CAUSE X-Y DRIVING/CONTROL UNIT 12 TO MOVE X COORDINATE BY PREDETERMINED PITCH

SURFACE PROFILE MEASUREMENT METHOD AND DEVICE USED THEREIN

TECHNICAL FIELD

The present invention relates to a surface profile measurement method and a surface profile measurement device for measuring a surface profile of a three-dimensional object. For example, in particular, the present invention relates to a surface profile measurement method and a surface profile measurement device suitable for measuring an optical element, a reflective surface or a refractive surface of which consists of a curved surface, in a nondestructive manner and noncontact manner, highly accurately, and in a wide tilt angle dynamic range using light.

BACKGROUND ART

As a technique for measuring a surface profile of a three-dimensional object in a nondestructive and noncontact manner and highly accurately using light, for example, as described in NPL 1 and U.S. Pat. No. 5,398,113 specification (publication) (PTL 1), there has been a technique for combining a light source, which emits white light, and a dual beam interferometer and detecting, with a two-dimensional image sensor, an interference figure (an interferogram) obtained by causing reflected light from a micro region on a sample surface and reflected light from a standard plane incorporated in the dual beam interferometer to interfere with each other through an objective lens to thereby measure a height distribution of the sample surface. In this technique, in each of pixels of the two-dimensional image sensor, the reflected light from the sample surface made incident to an effective light sensing area of the pixel and the reflected light from the standard plane cause interference. At least during surface profile measurement of the sample, a surface orientation of the standard plane is fixed and used without being configured to be changed with respect to an incident optical axis of the reflected light. Information concerning a tilt angle distribution of the sample surface is not directly measured. JP-A-2006-242853 (PTL 2) discloses a technique including a mechanism for, instead of setting a standard plane having high surface accuracy as a standard plane, setting, in a dual beam interferometer used in monochromatic interferometry, a reference object having a surface profile substantially equal to a surface profile of a sample and adjusting a surface orientation of the standard plane.

On the other hand, as another conventional technique, for example, as described in pp. 306 to 307 of NPL 2, there is also a technique for measuring a tilt angle distribution on a sample surface using an autocollimator. In this technique, it is also possible to obtain a height distribution on the sample surface by integrating the tilt angle distribution.

CITATION LIST

Patent Literature

PTL 1: U.S. Pat. No. 5,398,113
PTL 2: JP-A-2006-242853

Non Patent Literature

NPL 1: "Advanced Metrology of Surface Texture by Scanning White Light Interferometry", Atsushi SATO, The journal of the Surface Finishing Society of Japan, Vol. 57. No. 8, pp. 554 to 558, issued in 2006

NPL 2: "A survey on surface metrology for flatness standard", Yohan KONDO, AIST bulletin of Metrology, Vol. 8, No. 3, pp. 299 to 310, issued in September 2011

SUMMARY OF INVENTION

Technical Problem

In the surface profile measurement technique of the white light interference system described in U.S. Pat. No. 5,398,113 specification (publication) (PTL 1), wave fronts of the two reflected lights are parallel. That is, when an angle formed with respect to a surface orientation in a measured region corresponding to the pixel on the sample surface and an incident optical axis on the measured region and an angle formed by a surface orientation of the standard plane and an incident optical axis on the standard plane are the same, since an optical path difference between the two reflected lights is equal irrespective of a place in the pixel, a uniform interference effect is obtained. However, when the two wave fronts are not parallel and tilt at a certain angle each other, since the optical path difference changes between the two reflected lights according to a place in the pixel, the interference effect is not uniform. When a difference between optical path differences in the pixel is equal to or larger than an illumination wavelength, since the interference effect is cancelled by averaging, a surface profile cannot be measured. Further, to enable detection at a sufficient S/N without attenuating the interference effect, the difference between the optical path differences in the pixel needs to be kept within approximately a half of the illumination wavelength. In the technique, at least during surface profile measurement of the sample, the surface orientation of the standard plane is fixed and used without being configured to change with respect to the incident optical axis of the reflected light. Therefore, when the surface orientation in the measured region on the sample surface changes, a situation in which the interference effect is attenuated occurs in this way.

The width of each of the pixels is represented as d, a point image width of the objective lens is represented as d', the illumination wavelength is represented as $\lambda$, and a difference between the angle formed with respect to the surface orientation in the measured region corresponding to the pixel on the sample surface and the incident optical axis on the measured region and the angle formed by the surface orientation of the standard plane and the incident optical axis on the standard plane is represented as $\theta$. The point image width d' indicates width from a foot on one side where the intensity of a point spread function of the objective lens is sufficiently small to a foot on the other side. In this case, d' is approximately 1.6 times as large as a Rayleigh limit often used in general as a resolution limit. If d is larger than d', when $d \cdot \tan 2\theta \geq \lambda/2$ Expression 1, attenuation of the interference effect occurs. If d is smaller than d', replacing d of Expression 1 with d', when $d' \cdot \tan 2\theta \geq \lambda/2$ Expression 2, attenuation of the interference effect occurs. In both the cases, to prevent the interference effect from being attenuated, the expression has to be $d \cdot \tan 2\theta \geq \lambda/2$ Expression 3. When $\theta$ exceeds a range in which Expression 3 is satisfied, surface profile measurement is difficult. When visible light is used as the illumination light, the center wavelength of the visible light is approximately $\lambda=600$ nm. In an objective lens having a large working distance suitable for the surface profile measurement, since a numerical aperture (NA) is as large as approximately NA=0.55, d' is equal to or larger than approximately 1.06 micrometers. At this point, when the inclination angle of the sample surface increases and $\theta \geq 7.9°$, Expression 3 is not satisfied. The surface profile measurement making use of the interference effect is difficult.

On the other hand, the technique disclosed in JP-A-2006-242853 (Patent Literature 2) includes a mechanism for adjusting the surface orientation of the standard plane. It is taken into account that the interference effect in a place with a large inclination angle on the sample surface is secured. However, the mechanism is used to optimize, on the entire sample surface, alignment between an optical axis in the dual beam interferometer and optical elements before height distribution measurement of the sample is started. The technique is based on the premise that the sample surface and the standard plane have substantially equal surface profile distributions. Therefore, a situation in which the surface geometries of the sample surface and the standard plane are locally different is not taken into account. The alignment is only performed for the entire sample surface. Therefore, in the technique, the height distribution itself of the sample surface cannot be directly obtained. Only a distribution of a deviation of the height of the sample surface with respect to a height distribution of the reference object surface set as the standard plane can be measured. A technique for measuring information concerning the tilt angle distribution of the sample surface is not included either. In this way, in the technique, a surface profile of a sample having any surface profile cannot be measured.

On the other hand, in the surface profile measurement technique for measuring a tilt angle distribution of a sample surface using the autocollimator described in pp. 306 to 307 of NPL 2, a measurement range of a high-precision autocollimator is approximately ± several ten seconds to ± several hundred seconds. A surface profile set as a measurement target is limited to a plane or a gentle curved surface. When the inclination angle of the sample surface increases, surface profile measurement is difficult.

The present invention has been devised in view of the above and it is an object of the present invention to provide a technique that can measure a surface profile of any test object in a nondestructive manner and noncontact manner, highly accurately, and in a wide tilt angle dynamic range.

Solution to Problem

In order to attain the object, the present invention provides, in white light interference method using a dual beam interferometer, a technique for configuring a surface orientation of a standard plane to be changed with respect to an incident optical axis on the standard plane, acquiring, while relatively changing the surface orientation of the standard plane with respect to a local surface orientation in any position on a test surface, a plurality of interferograms generated by interference of reflected light from the test surface and reflected light from the standard plane, and calculating the local surface orientation on the test surface from the interferograms to thereby measure a surface profile of the test surface.

Advantageous Effect of Invention

In the present invention, it is possible to not only measure a surface profile of any test object in a nondestructive and noncontact manner using light but also measure the surface profile highly accurately and in a wide tilt angle dynamic range.

BRIEF DESCRIPTION OF THE DRAWINGS

FIG. 3 is a diagram showing an operation flow of the surface profile measurement device according to the first embodiment of the present invention.

DESCRIPTION OF EMBODIMENTS

Embodiments of the present invention are explained below with reference to the drawings.

First Embodiment

Figure 1:
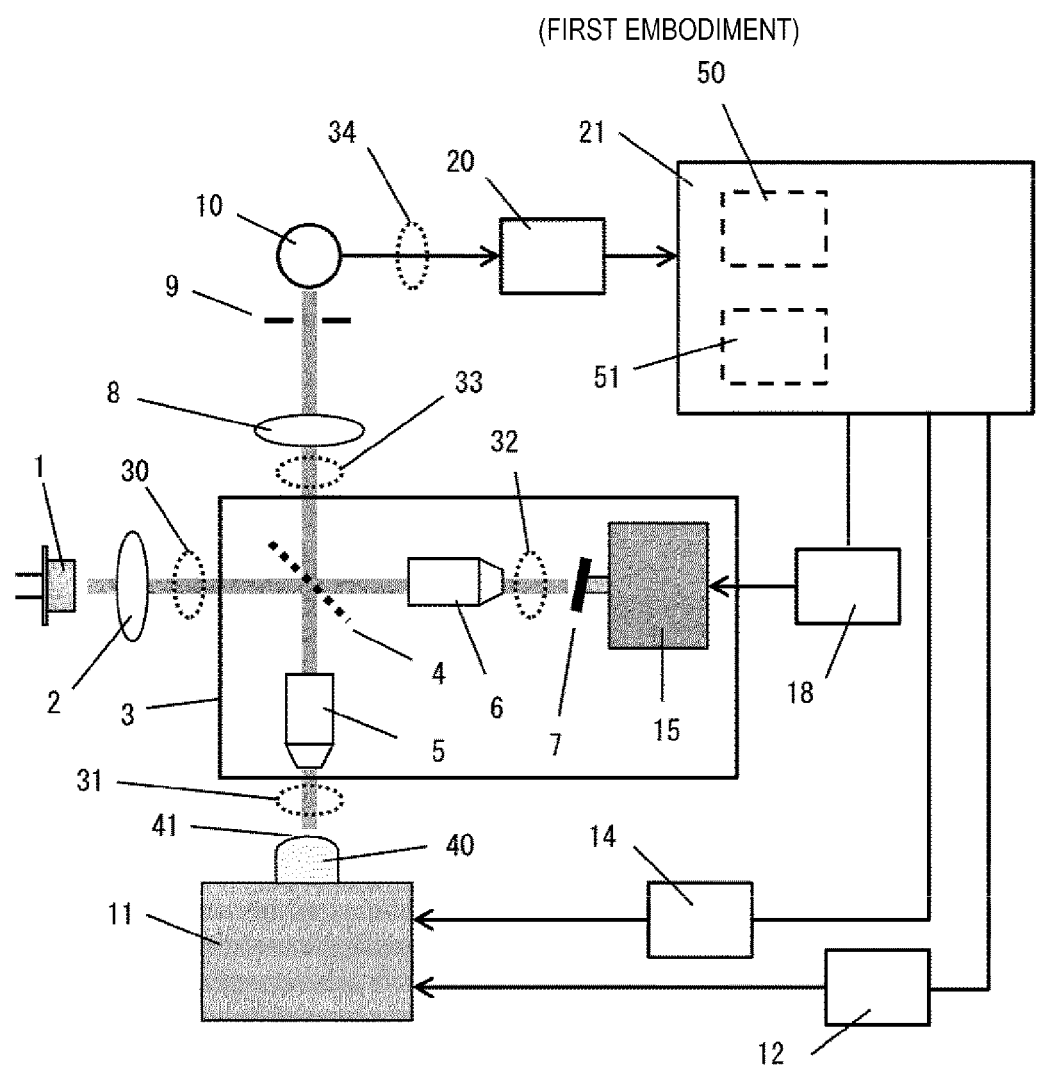
FIG. 1 is a diagram showing the configuration of a surface profile measurement device according to a first embodiment of the present invention.

FIG. 1 is a diagram showing the configuration of a surface profile measurement device according to a first embodiment of the present invention. As a light source 1, a broad spectral band light source that generates light having a continuous wavelength such as a halogen lamp, a Xe lamp, or an LED is used. A light beam emitted from the light source 1 changes to a parallel beam 30 through an illumination optical system 2 including a lens or a reflection mirror for condensing and light beam parallelization and is made incident on a beam splitter 4 in a dual beam interferometer 3. The parallel beam 30 is divided into two light beams by the beam splitter 4. One divided light beam is reflected after being made incident on an illumination region 41 on the surface of a sample 40 through a sample-side objective lens 5, changes to a sample-side reflected light beam 31, and returns to the beam splitter 4 through the sample-side objective lens 5 again. The sample 40 is mounted on a sample moving stage 11 and is movable in orthogonal two axial directions (an X axis and a Y axis) and an optical axis direction (a Z axis) with respect to an optical axis of the sample-side objective lens 5. The X axis and the Y axis are used to move the position of the illumination region 41 on the sample 40. An X-coordinate value and a Y-coordinate value are controlled by an X-Y driving/control unit 12. The Z axis is driven by a piezo actuator 13 (not shown in the figure). A Z-coordinate value can be controlled by a Z-axis control unit 14 at resolution of approximately 1 nanometer. The other of the two light beams divided by the beam splitter 4 is made incident on a standard plane 7 through a reference-side objective lens 6 and thereafter changes to a reference-side reflected light beam 32 and returns to the beam splitter 4 through the reference-side objective lens 6 again. The sample-side objective lens 5 and the reference-side objective lens 6 are set such that distances from the beam splitter 4 are equal to each other. The standard plane 7 is set in a focusing position of the reference-side objective lens 6. An inclination angle of the standard plane 7 can be changed with respect to two axes orthogonal to an optical axis and corresponding to X and Y axes of the sample moving stage 11 by a two-axis inclining mechanism 15. In the following explanation, an inclination angle in a direction corresponding to the X axis is represented as θx and an inclination angle in a direction corresponding to the Y axis is represented as θy. θx and θy are respectively driven by piezo actuators 16 and 17 (not shown in the figure). Angle control can be performed by an inclination-angle control unit 18 at resolution of approximately 5 micro-radians. The sample-side reflected light beam 31 and the reference-side reflected light beam 32 returning to the beam splitter 4 in this way are wave-optically combined to generate an interference light beam 33. After the interference light beam 33 is made incident on a focusing lens 8, a part of the interference light beam 33 passes through a field stop 9 set on a focusing surface of the focusing lens. The focusing lens 8 is adjusted to focus an image of the illumination region 41 on the focusing surface in a state in which the illumination region 41 is placed in a focusing position of the sample-side objective lens 5. The interference light beam 33 passed through the field stop 9 is lead to a photodetector 10. The light intensity of the interference light beam 33 is converted into an electric signal. The interference light beam 33 changes to an interference light intensity signal 34. The interference light intensity signal 34 is captured into the computer 21 through an A/D converter 20 and subjected to arithmetic processing. The computer 21 gives commands to the X-Y driving/control unit 12, the Z-axis control unit 14, and the inclination-angle control unit 18 and causes the units to change the X-coordinate value, the Y-coordinate value, the Z-coordinate value, and values of θx and θy.

Figure 2A:
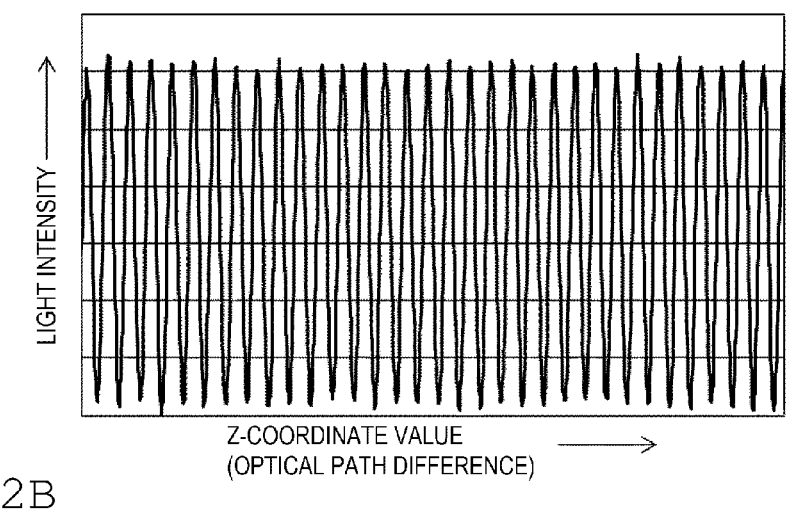
FIG. 2(a) FIG. 2A is a diagram showing an example of an interferogram according to the first embodiment of the present invention (in the case of a monochromatic light source).
Figure 2B:
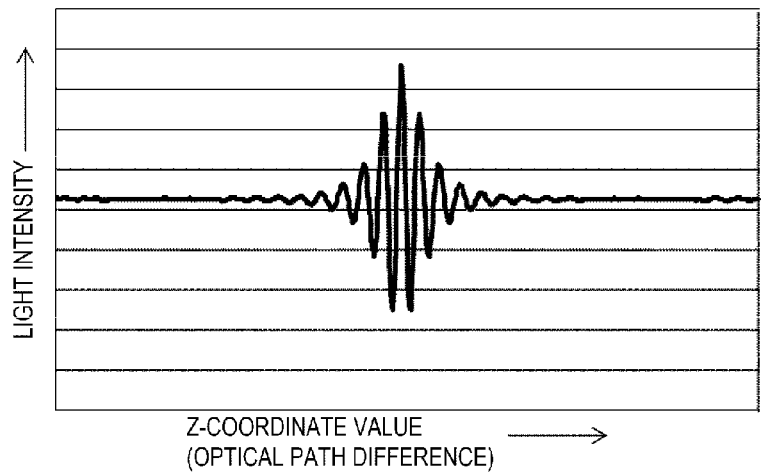
FIG. 2(b) FIG. 2B is a diagram showing an example of an interferogram according to the first embodiment of the present invention (in the case of a broad spectral band light source).

In general, the dual beam interferometer represented by a Michelson interferometer artificially gives a change in a phase difference to between divided light beams and thereafter recombines the light beams, causes the light beams to interfere, and records a change in interference light intensity involved in the change in the phase difference. Numerical value data of the change in the interference light intensity involved in the change in the phase difference, a figure obtained by graphing the numerical value data, or an optical image obtained by spatially generating the change in the interference light intensity as a light amount distribution of light and shade is called interferogram (interference figure). The phase difference depends on an optical path difference between optical paths of tracing of the two light beams from the division to the recombination, that is, a difference between optical lengths and the wavelength of light in use. In the optical system in this embodiment, the optical path difference between the two light beams is a difference of an optical path of the beam splitter 4→the sample-side objective lens 5→the illumination region 41 on the sample 40→the sample-side objective lens 5→the beam splitter 4→and an optical length of an optical path of the beam splitter 4→the reference-side objective lens 6→the standard plane 7→the reference-side objective lens 6→the beam splitter 4. When the phase difference is represented as φ radians, the optical path difference between the two divided light beams is represented as ΔL micrometers, and a wavelength in use is represented as λ micrometers, $$\varphi = 2\pi\Delta L/\lambda \qquad \text{Expression 4}$$

is obtained. Therefore, the dual beam interferometer is often configured to place a reflection mirror in the optical path of one of the two light beams and translate the position of the reflection mirror to thereby change the optical length and record an interferogram. When a light source in use is a monochromatic light source that emits only light having a single wavelength, an equal interference light intensity change repeatedly occurs every time the optical path difference becomes twice as large as the wavelength of the light source. Therefore, an interferogram consisting of a single COS waveform shown in FIG. 2a is obtained. On the other hand, when a broad spectral band light source that generates light having a continuous wavelength is used, interference between two light beams is so-called white light interference. It is well known that, as shown in FIG. 2b, light intensity takes a maximum value in an optical path difference (a zero optical path difference) at which phase differences are substantially zero in common at wavelengths included in the light source and a vibration waveform is observed only around the optical path difference.

The operation of the computer 21 after the sample 40 is mounted on the sample moving stage 11 is explained using an operation flow in FIG. 3. Processing of the operation flow in FIG. 3 is incorporated in the computer 21 as an inclination-angle measuring function 50.

In this embodiment, as shown in Step 9 to Step 12, the computer 21 gives a command to the Z-axis control unit 14 and causes the Z-axis control unit 14 to move the Z-coordinate value from a predetermined initial position to an end position and captures the interference light intensity signal 34 to thereby record one interferogram. The initial position and the end position are determined to include the zero optical path difference. The shape of the interferogram obtained at this point is generally as shown in FIG. 2b. An amount serving as an interference contrast C is defined. When a light source in use is a monochromatic light source, the interference contrast C is generally defined by the following expression. In the expression, the Z coordinate is changed to Z0, Z1, . . . , and Zn at a fixed interval, interference light intensity in Zi is represented as Ji, max{Ji} represents a maximum value among J0, J1, . . . , and Jn, and min{Ji} represents a minimum value.

$$C = [\max\{Ji\} - \min\{Ji\}]/[\max\{Ji\} + \min\{Ji\}] \qquad \text{Expression 5}$$

However, when a white light source is used, since the vibration waveform of the interference intensity is observed only around the zero optical path difference as shown in FIG. 2b and an envelope of vibration is attenuated as the optical path difference is further away from the zero optical path difference, the definition by the above expression is inappropriate. Therefore, in the present invention, the interference contrast C is defined by the following expression when a z coordinate of a zero optical path difference position is represented as Zc, the vibration waveform of the interference intensity is observed in a range of Za to Zb, and an average of the interference intensity {Ji} in a range of a≤i≤b is represented as J0.

$$C = \left[\left\{\sum_{i=a}^{b}(Ji-J0)^2\right\}/(b-a+1)\right]^{(1/2)}/J0 \qquad \text{Expression 6}$$

Expression 6 is equal to a relative standard deviation of {Ji} in the range of a≤i≤b. The calculation of the interference contrast is performed in Step 13. In this embodiment, as shown in Step 5 to Step 15, the recording of one interferogram is performed every time the computer 21 gives a command to the inclination-angle control unit 18 and causes the inclination-angle control unit 18 to move θx and θy from predetermined initial positions to end positions by a predetermined pitch.

Figure 4:
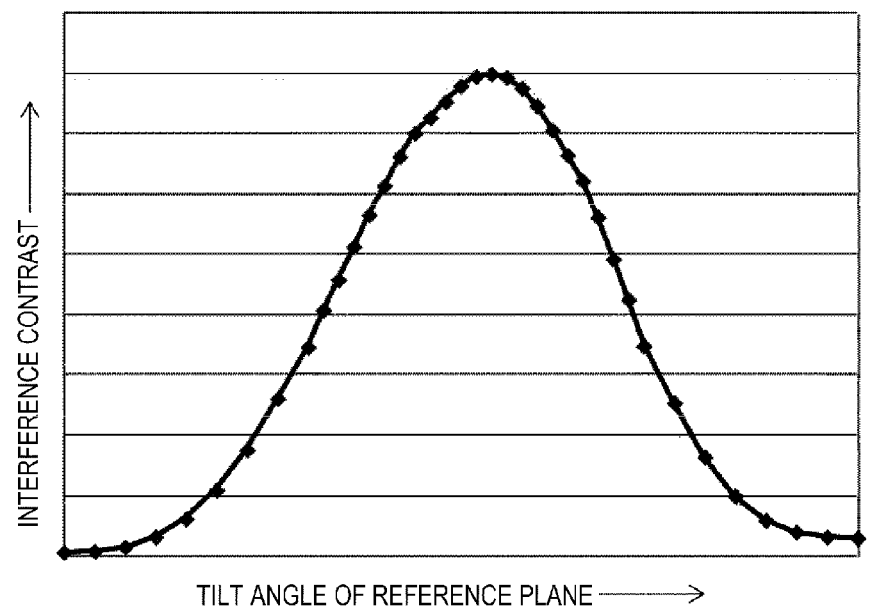
FIG. 4 is a diagram showing an effect at the time when a surface orientation of a standard plane is changed by the surface profile measurement device according to the first embodiment of the present invention.

A result of an actually performed test using a dual beam interferometer same as the configuration in this embodiment is shown in FIG. 4. In the test, as the sample 40, a plane mirror 42, to an optical axis of which a predetermined inclination angle was given in advance, was placed, an inclination angle of the standard plane 7 was changed, and a relation between the inclination angle of the standard plane 7 obtained at that point and the interference contrast C was checked. As a result of the test, it was confirmed that the interference contrast C was maximized when the inclination angle of the plane mirror 42 placed as the sample and the inclination angle of the standard plane 7 were equal to each other. In this test, as differences from the configuration in this embodiment, the field stop 9 was detachably attachable, a CCD camera was able to be placed instead of the field stop 9, and an image formed when the interference light beam 33 was focused by the focusing lens 8 was able to be observed. As a result, it was found that, when the inclination angles of the plane mirror 42 and the standard plane 7 were different, interference fringes of light and shade appeared on an image acquired by the CCD camera, an interval of the interference fringes increased as the difference between the inclination angles decreased, and, when the inclination angles were equal and had no difference, the interference fringes were not observed. From the two test results, it is seen that, when the inclination angles of the plane mirror 42 and the standard plane 7 are equal, the optical path difference is equal in the entire region of the field stop 9 and the interference fringes of light and shade are not observed and, when the plane mirror 42 is moved in the optical axis direction, since all phases of light beams passing in the region uniformly change, the interference contrast C is maximized. In general, a surface profile of the sample 40 needs to be considered a non-plane. However, the surface profile in the illumination region 41 in a microscopic sense can be approximately regarded as being sufficiently a plane under an optical microscope. Therefore, from the test results, it is seen that an inclination angle of a local micro plane in the illumination region 41 on the sample 40 can be measured by detecting an inclination angle of the standard plane 7 at the time when the interference contrast C is maximized. Even when the inclination angle of the plane mirror 42 increases, by also increasing the inclination angle of the standard plane 7 according to the increase in the inclination angle, the phases of the light beams passing in the region can be uniformly aligned and the interference contrast can be secured.

Referring back to the operation flow in FIG. 3, in this embodiment, in Step 16, a set of ($\theta x$, $\theta y$) for maximizing the interference contrast C is detected. In order to obtain a set of ($\theta x$, $\theta y$) serving as a solution at high accuracy, in Step 14 and Step 15, it is necessary to set the pitch in moving $\theta x$ and $\theta y$ sufficiently fine. However, as shown in FIG. 4, the interference contrast C shows only an extremely gentle change with respect to a change in $\theta x$ and $\theta y$ near a maximum point of the interference contrast C. When a measurement result of the interference contrast C wavers because of superimposition of noise, a large error is caused. Therefore, in the present invention, in Step 16, a predetermined fitting function F($\theta x$, $\theta y$) is fit to numerical values of a plurality of interference contrasts C obtained in Step 5 to Step 15 by a method of least squares using a value of ($\theta x$, $\theta y$) corresponding to a vertex position as an unknown number. A set of ($\theta x$, $\theta y$) obtained as a most matching result is adopted as a solution. The set of ($\theta x$, $\theta y$) obtained at this point is measurement values of inclination angles in two axial directions of X-Y on the local micro plane in the illumination region 41 on the sample 40 mounted on the sample moving stage 11. In order to obtain inclination angles for all surfaces on the sample 40, as shown in Step 1 to Step 18, the sample moving stage 11 is moved in the X-Y directions and the processing shown in Step 5 to Step 16 is repeated. In this way, in this embodiment, a tilt angle distribution ($\theta x$, $\theta y$) can be measured on the all the surfaces on the sample 40.

The inclination angles ($\theta x$, $\theta y$) in the two axial directions of X-Y on the local micro plane in the illumination region 41 on the sample 40 mounted on the sample moving stage 11 are differential values of a sample surface Z=F(X, Y) in the local plane position. That is, $$\theta x = \partial F(X,Y)/\partial X, \quad \theta y = \partial F(X,Y)/\partial Y \qquad \text{Expression 7}$$

Therefore, by integrating ($\theta x$, $\theta y$) on a two-dimensional plane of X-Y by giving an appropriate initial value, conversely, it is possible to reconstruct a distribution of Z=F (X, Y). In this embodiment, the computer 21 also includes an inclination angle/height converting function 51 for converting an inclination angle into Z height according to this integration conversion. It is possible to calculate a height distribution Z=F (X, Y) from the distribution of the inclination angles ($\theta x$, $\theta y$) measured as explained above.

In this way, in this embodiment, a height distribution and a tilt angle distribution can be measured as a surface profile of any test object in a nondestructive manner and noncontact manner, highly accurately, and in a wide tilt angle dynamic range using light.

Second Embodiment

Figure 5:
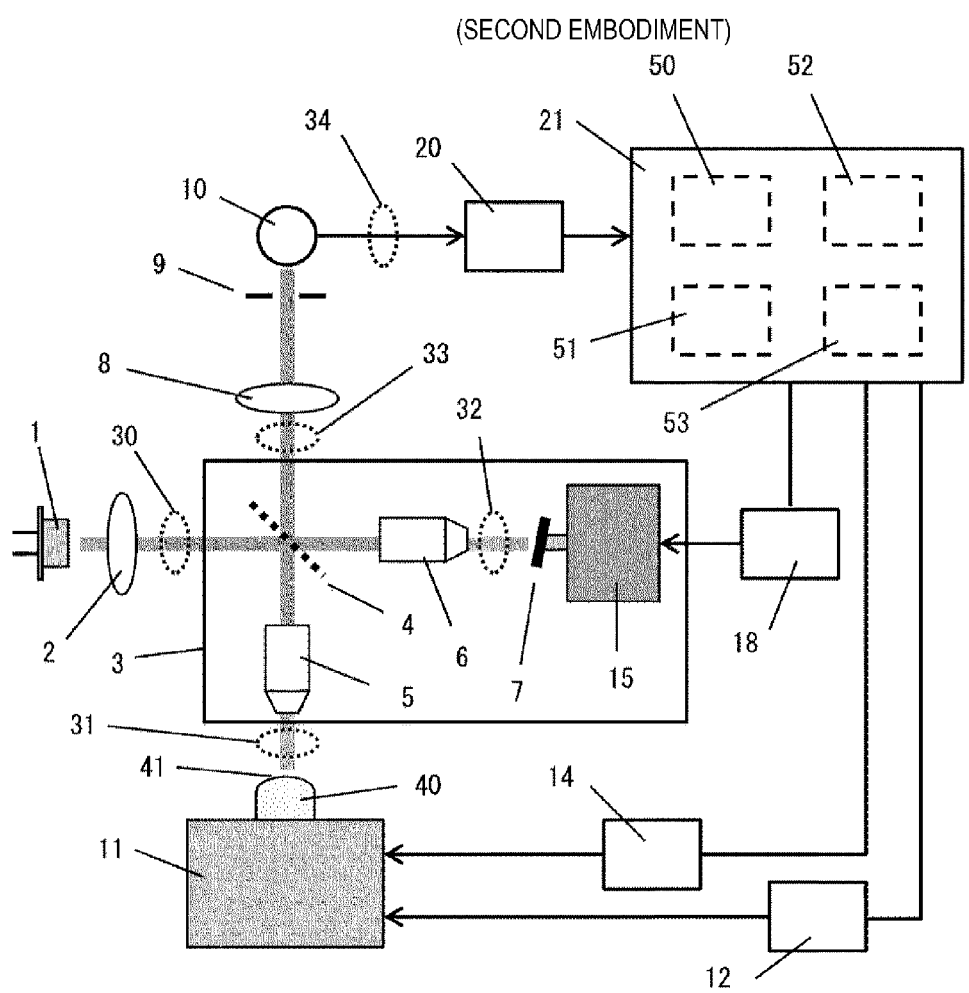
FIG. 5 is a diagram showing the configuration of a surface profile measurement device according to a second embodiment of the present invention.

A second embodiment of the present invention is explained with reference to FIG. 5, which is a configuration diagram in the second embodiment.

In this embodiment, a mechanism for measuring the height Z of the local micro plane in the illumination region 41 on the sample 40 is added to the first embodiment to make it possible to evaluate an up-down fluctuation characteristic of a sample moving stage. As explained above, in the first embodiment, it is possible to calculate the height distribution Z=F (X, Y) by directly measuring the distribution of the inclination angles ($\theta x$, $\theta y$). However, in addition to this, this embodiment has a function of directly measuring the height distribution Z=F (X, Y) using a dual beam interferometer. An optically directly measured height distribution is represented as Z1=F1 (X, Y) and a height distribution calculated by integrating a tilt angle distribution is represented as Z2=F2(X, Y) to distinguish the height distributions. In Z1, not only height information of the sample 40 but also undesired up-down height fluctuation of the stage surface in driving the sample moving stage 11 to move the measurement position is included as an error. On the other hand, when the stage surface moves up and down according to the driving, if fluctuation in an angle direction is sufficiently small, since inclination angle measurement is hardly affected by the fluctuation, Z2 does not involve an error. Therefore, it is possible to evaluate a height fluctuation characteristic of the sample moving stage 11 by calculating a difference of Z1−Z2. Therefore, in this embodiment, in the computer 21, a height measuring function 52 and a height-difference detecting function 53 are provided in addition to the inclination-angle measuring function 50 and the inclination angle/height converting function 5l. The other components are the same as the components in the first embodiment.

In this embodiment configured as explained above, besides the effects obtained in the first embodiment, it is possible to evaluate the up-down fluctuation characteristic of the sample moving stage.

REFERENCE SIGNS LIST

1 Light source
2 Illumination optical system

3 Dual beam interferometer
4 Beam splitter
5 Sample-side objective lens
6 Reference-side objective lens
7 Standard plane
8 Focusing lens
9 Field stop
10 Photodetector
11 Sample moving stage
12 X-Y driving/control unit
13, 16, 17 Piezo actuators
14 Z-axis control unit
15 Two-axis inclining mechanism
18 Inclination-angle control unit
20 A/D converter
21 Computer
30 Parallel beam
31 Sample-side reflected light beam
32 Reference-side reflected light beam
33 Interference light beam
34 Interference light intensity signal
35 Interferogram
40 Sample
41 Illumination region
50 Inclination-angle measuring function
51 Inclination angle/height converting function
52 Height measuring function
53 Height-difference detecting function

The invention claimed is:

1. A surface profile measurement method for comparing a test surface and a standard plane to thereby measure both of a surface height and a surface orientation of the test surface in any position on the test surface, the surface profile measurement method being configured to capable of determining, only with measurement data in one position on the test surface, both of the surface height and the surface orientation without requiring to calculate the surface height and the surface orientation from measurement data in two or more positions on the test surface and by changing the standard plane compared with the test surface.

2. A surface profile measurement method for dividing an illumination light beam emitted from a light source continuously or discretely having a predetermined wavelength bandwidth or a light source for emitting monochromatic light into two light beams and making the light beams incident on a test surface and a standard plane, and causing a reflected light beam from the test surface and a reflected light beam from the standard plane to interfere in an interferometer to measure a surface profile of the test surface, the surface profile measurement method being configured to be capable of changing a surface orientation in the illumination light beam incident position on the standard plane and configured to be capable of measuring a local surface orientation of the test surface in one or a plurality of positions on the test surface.

3. The surface profile measurement method according to claim 2, wherein the surface orientation in the illumination light beam incident position on the standard plane can be changed by configuring the surface profile measurement method to be capable of, using a plane mirror as the standard plane, inclining or rotating the surface orientation of the standard plane in two axial directions orthogonal to each other and both orthogonal to an optical axis.

4. The surface profile measurement method according to claim 2, wherein the surface orientation in the illumination light beam incident position on the standard plane can be changed by using, as the standard plane, a curved surface mirror, a local surface orientation of a reflective surface of which continuously or discretely changes in two axial directions orthogonal to each other and both orthogonal to an optical axis, and translating the entire standard plane in the two axial directions orthogonal to the optical axis.

5. The surface profile measurement method according to claim 2, wherein the surface profile measurement method is configured to measure a local surface orientation of the test surface by changing the surface orientation of the standard plane relatively to a local surface orientation in any position on the test surface and calculating a surface orientation of the standard plane at time when the local surface orientation on the test surface and a surface orientation in the illumination light beam incident position on the standard plane are equal.

6. The surface profile measurement method according to claim 5, wherein the surface profile measurement method is configured to determine that, when an interference contrast is maximized in an interferogram obtained by interference of a reflected light beam from the test surface and a reflected light beam from the standard plane, the local surface orientation on the test surface and the surface orientation of the standard plane are equal.

7. The surface profile measurement method according to claim 6, wherein the surface profile measurement method is configured to calculate a relative standard deviation from interference intensity data configuring the interferogram and use the relative standard deviation as the interference contrast.

8. The surface profile measurement method according to claim 6, wherein the surface profile measurement method is configured to, in calculating a surface orientation of the standard plane at the time when the interference contrast is maximized, instead of finding a maximum value out of interference contrasts, which are measured by changing the surface orientation continuously or discretely at a sufficiently fine pitch, and calculating the surface orientation corresponding to the maximum value, match a predetermined interference contrast distribution function with a plurality of interference contrast values, which are measured by roughly discretely changing the surface orientation, using a surface orientation corresponding to the maximum value of the interference contrast as an unknown number and calculate the surface orientation as a surface orientation at time when the interference contrast distribution function matches the interference contrast value most.

9. The surface profile measurement method according to claim 2, wherein, when a Z axis is plotted in an illumination optical axis direction with respect to the test surface and a value of a Z coordinate of the test surface is referred to as height of the test surface, the surface profile measurement method includes a function of obtaining, from surface orientation data measured in two or more positions on the test surface, surface height calculation values of the test surface in the positions according to integration processing.

10. The surface profile measurement method according to claim 2, wherein the surface profile measurement method is configured to measure both of a local surface orientation and height of the test surface using an interferogram obtained in any position on the test surface.

11. The surface profile measurement method according to claim 10, wherein the surface profile measurement method is configured to irradiate, as the illumination light beam, illumination light continuously or discretely having a predetermined wavelength bandwidth on the test surface and the standard plane.

12. The surface profile measurement method according to claim 10, wherein the surface profile measurement method is configured to include, as the illumination light beam, a light source continuously or discretely having a predetermined wavelength bandwidth for measuring the height and a monochromatic light source for measuring the local surface orientation and simultaneously or sequentially irradiate illumination lights from the light sources on the test surface and the standard plane.

13. The surface profile measurement method according to claim 1, wherein the surface profile measurement method includes a sample moving stage for moving a position of a sample having the test surface in order to change a measurement position on the test surface, includes a function of obtaining, from surface orientation data measured in two or more positions on the test surface, surface height calculation values in the positions according to integration processing, and includes a function of comparing surface heights measured in the positions and the surface height calculation values.

14. The surface profile measurement method according to claim 13, wherein the surface profile measurement method is configured to be capable of obtaining, on the basis of a result obtained by comparing the surface heights measured in the positions and the surface height calculation values, a height fluctuation distribution of the entire sample involved in movement of the sample moving stage.

15. A surface profile measurement device comprising:

a light source continuously or discretely having a predetermined wavelength bandwidth;

an interferometer including a sample moving stage configured to divide, with a beam splitter, an illumination light beam into a measurement light beam and a reference light beam, reciprocatingly move the measurement light beam between a sample and a test surface through a first objective lens, and reciprocatingly move the reference light beam between the sample and a standard plane through a second objective lens manufactured to have a characteristic same as a characteristic of the first objective lens, the sample moving stage being capable of mounting the sample including the test surface and moving a measurement position and changing a relative distance in a direction along an optical axis of the measurement light beam between the sample and the first objective lens, after giving a change to an optical path difference represented by a relative difference between an optical length for reciprocatingly moving the measurement light beam between the sample and the measurement surface and an optical length for reciprocatingly moving the reference light beam between the sample and the standard plane, the interferometer recombining the measurement light beam and the reference light beam after the reciprocating movement and causing the light beams to interfere;

a control unit that controls the sample moving stage and the interferometer;

a photodetector that converts intensity of interference light obtained by the interferometer into an electric signal; and a data processing unit that processes an output signal of the photodetector, the surface profile measurement device controlling the sample stage and the interferometer in a plurality of sampling positions on the test surface and subjecting an output signal output from the photodetector to calculation processing in the data processing unit to thereby measure a surface profile of the test surface, wherein a plane mirror is used as the standard plane of the interferometer, a surface orientation of the standard plane is set to be capable of inclining or rotating in two axial directions orthogonal to each other or both orthogonal to an optical axis, the control unit is configured to change the surface orientation of the standard plane in the two axial directions and change a position of the sample moving stage in a direction along an optical axis of the measurement light beam to thereby change the optical path difference, the photodetector is configured to convert an intensity change of the interference light involved in a change in the surface orientation and the optical path difference into an electric signal, the data processing unit is configured to subject a change in the electric signal to calculation processing to detect local surface orientations of the test surface in the sampling positions on the test surface.

16. The surface profile measurement device according to claim 15, wherein, in the detection of the local surface orientation, the surface profile measurement device is configured to change the surface orientation of the standard plane to a plurality of orientations stepwise in the two axial directions, match a predetermined interference contrast distribution function with an interference contrast of the interference light observed when the optical path difference is scanned in a predetermined range using, as an unknown number, a surface orientation corresponding to a maximum value of the interference contrast, and calculate the surface orientation as a surface orientation at time when the interference contrast distribution function matches the interference contrast value most.

17. The surface profile measurement device according to claim 15, wherein, when a Z axis is plotted in an illumination optical axis direction with respect to the test surface and a value of a Z coordinate of the test surface is referred to as height of the test surface, the surface profile measurement device includes a function of obtaining, from surface orientation data measured in two or more positions on the test surface, surface height calculation values of the test surface in the positions according to integration processing.

18. The surface profile measurement device according to claim 15, wherein the surface profile measurement device is configured to measure both of a local surface orientation and height of the test surface using an interferogram obtained in any position on the test surface.

\* \* \* \* \*